United States Patent
Brooker et al.

(10) Patent No.: US 12,346,327 B1
(45) Date of Patent: Jul. 1, 2025

(54) COMPACT HOSTING OF DATABASE QUERY PROCESSORS USING VIRTUALIZATION SNAPSHOTS

(71) Applicant: Amazon Technologies, Inc., Seattle, WA (US)

(72) Inventors: Marc Brooker, Seattle, WA (US); Gourav Roy, Redmond, WA (US); James Alexander Morle, Dripping Springs, TX (US); Anthony Nicholas Liguori, Bainbridge Island, WA (US); Marc Bowes, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 13 days.

(21) Appl. No.: 18/194,578

(22) Filed: Mar. 31, 2023

(51) Int. Cl.
G06F 16/2455 (2019.01)
G06F 11/34 (2006.01)
G06F 16/25 (2019.01)
H04L 67/14 (2022.01)

(52) U.S. Cl.
CPC .... *G06F 16/24553* (2019.01); *G06F 11/3423* (2013.01); *G06F 16/256* (2019.01); *H04L 67/14* (2013.01)

(58) Field of Classification Search
CPC ........... G06F 16/24553; G06F 11/3423; G06F 16/256; H04L 67/14
See application file for complete search history.

(56) References Cited

U.S. PATENT DOCUMENTS

| | | | |
|---|---|---|---|
| 9,563,513 B2 | 2/2017 | Huang | |
| 10,552,268 B1* | 2/2020 | Xu | G06F 11/1466 |
| 11,436,091 B2 | 9/2022 | Zhang | |
| 2010/0070725 A1* | 3/2010 | Prahlad | G06F 11/1453 |
| | | | 718/1 |
| 2016/0139942 A1* | 5/2016 | Tsirkin | G06F 9/45558 |
| | | | 718/1 |
| 2017/0371750 A1* | 12/2017 | Horowitz | G06F 16/904 |
| 2018/0285215 A1 | 10/2018 | Ashraf | |
| 2018/0288143 A1* | 10/2018 | Hwang | H04L 43/20 |
| 2018/0365110 A1 | 12/2018 | Venkatesh | |
| 2021/0144205 A1* | 5/2021 | Radev | H04L 67/56 |
| 2024/0004685 A1* | 1/2024 | Ye | G06N 20/00 |

FOREIGN PATENT DOCUMENTS

CN            115587119 A   *   1/2023

* cited by examiner

*Primary Examiner* — Robert W Beausoliel, Jr.
*Assistant Examiner* — Mohammad S Bhuyan
(74) *Attorney, Agent, or Firm* — S. Scott Foster; Kowert, Hood, Munyon, Rankin & Goetzel, P.C.

(57) ABSTRACT

Compact hosting of database query processors is performed using virtualization snapshots. When a request to access a database is received via a previously established connection from a client for an idle query processor that is not currently executing, a virtualization snapshot may be identified that is associated with the idle query processor. The virtualization snapshot of the query processor may be used to restore the query processor into virtual execution on a host system for the database using an origin snapshot that shares clean pages across multiple query processors on the host system. The request may be performed by the restored query processor in virtual execution on the host system.

20 Claims, 9 Drawing Sheets

COMPACT HOSTING OF DATABASE QUERY PROCESSORS USING VIRTUALIZATION SNAPSHOTS

BACKGROUND

Commoditization of computer hardware and software components has led to the rise of service providers that provide computational and storage capacity as a service. At least some of these services, such as database services, are implemented in distributed fashion in order to provide durability and availability of data. In this way, workloads for client applications can be distributed amongst multiple components of a distributed database system in order to provide consistent performance.

Figure 1A:
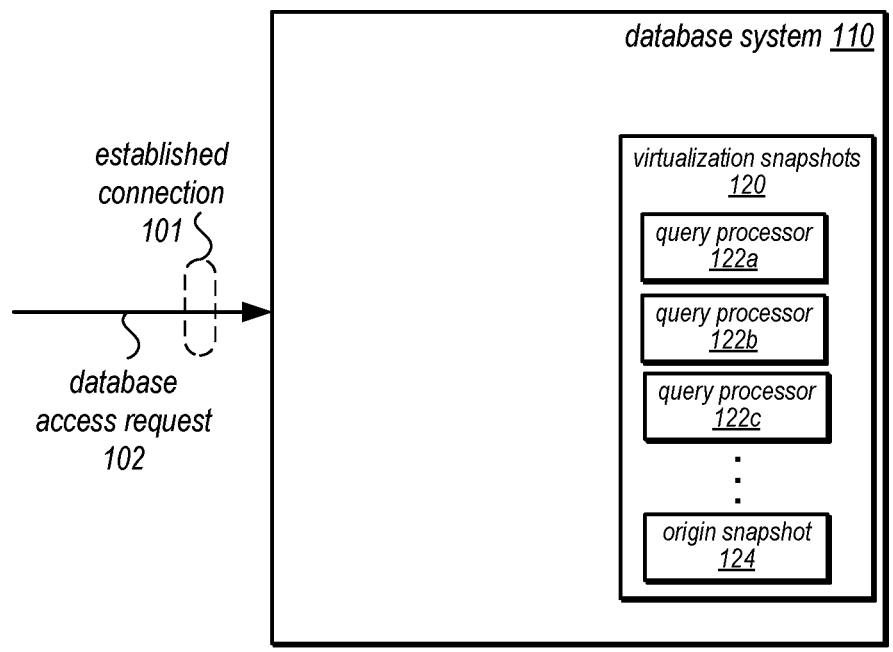
FIGS. 1A-1B are logical block diagrams illustrating compact hosting of query processors using virtualization snapshots, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Various embodiments of compact hosting of query processors using virtualization snapshots are described herein. To support large numbers of connections between database client applications and databases, techniques for compact hosting of query processors using virtualization snapshots may transition between idle and active query processors using snapshot techniques in order create, run, and keep idle query processors to scale connection placement for query processors up to a one connection to one query processor ratio.

For example, some query processors may utilize stateful sessions even when there are not transactions being performed using the session. This state information may include information that uses a small amount of space, such as variables, up to information that uses a large amount of space, such as temporary tables. Because this state information is used by a query processor, it may be beneficial to implement techniques that allow for state information to be managed on a per-query processor basis. Compact hosting of query processors may provide for improved management of state information on a per-query processor basis.

Consider an example where a client application establishes a session for a database. The client application may call the Domain Name Service (DNS) and get an load balancing endpoint. The client may then establish a connection, through the load balancer, to a relay or some other placement management system. This system may, which allocate the session to a query processor host (either a new one, or one where the client application already has a running query processor handling other sessions). The relay then connects to the query host, and is assigned a query processor, which may exist for the lifetime of the session.

In this example, on each query processor host is some number of query processors, each running inside its own virtualization unit (e.g., as a virtual machine instance, a micro virtual machine (MicroVM), container, or other virtualization technique). Each query processor may be allocated (for its entire lifetime) to a single database for a single database owner/operator, but can handle multiple concurrent sessions for that database. When a query processor is busy it simply runs inside its virtualization unit, consuming as much CPU and memory as it needs (up to a limit). When a query processor has been idle for some time, a virtualization snapshot of the query processor can be created and saved onto non-volatile memory where it can be quickly restored. In this example, idle can mean that it may have active connections and sessions, but has no in-flight transactions.

To keep connections alive even though the query processor has been snapshotted, in this example there may be a local agent or other management component which terminates the connections from the relay. For running query processors, the agent forwards the packets straight to the query processor. For an idle query processor, if the agent gets a packet (other than a trivial keepalive), the agent may restores the query processor from its snapshot and starts sending it work. Fast restoration times may be achieved, such as a restore that could take as little as 5 ms.

This example, as well as other examples of compact hosting of query processors, may improve the performance of the database system by simplifying the query processor. The query processor may execute as if it is a long-running process, and keep per-session state (even things like temp tables) in memory. The query processor may not have to worry about optimizing idle sessions, or about serializing or deserializing session state.

FIG. 1A are logical block diagrams illustrating compact hosting of query processors using virtualization snapshots, according to some embodiments. In FIG. 1A, database system 110 may be a stand-alone database system (e.g., implemented on private network systems or services or implemented by a user of a cloud or other provider network, like the provider network discussed in detail below with regard to FIG. 2). In some embodiments, database system 110 may be database service, like database service 210 discussed in detail below with regard to FIGS. 2-6B, which may be implemented and managed by a provider network. Database system 110 may be one of many different types of database, including types that support different kinds of access to database data, such as through the use of a query language like Structured Query Language (SQL) or APIs or other commands that provide a NoSQL interface. Different types of databases may store data for the database in different formats and according to different data models. For instance, one type of database may use a relational data model that imposes a common schema for a table of the relational database and another type of database may use a non-relational data model that imposes a flexible schema, which may not be common across different items or objects in the database. Databases may store various types of data including, but not limited to, graph databases storing data using a graph data model, time series databases storing time series data, key-value database that use a unique key-value to lookup data objects of various data types or formats in the database, or document databases that store data as a document with varying attributes, including nested data.

Database 110 may store a database in a storage system which may be attached or accessible to query processors, such as query processor 142. In some embodiments, a non-distributed storage system may be implemented to store a database. In other embodiments, the database may be stored in a distributed data storage system, such as storage service 220 discussed below with regard to FIGS. 2-5. Query processors may be implemented as instances, nodes, or other independent applications that can include one or more multiple layers in a database system application stack, implemented together on a common node, server, instance, or separated across different layers of nodes, servers, or other host systems, in various embodiments. For instance, as discussed below with regard to FIG. 3, a database service may implement query processors, a front-end, and adjudicators on respective host systems in addition to a journal for a database. In some embodiments, these host systems may be distributed (e.g., in different data centers or other different locations, such as on different server racks) so as to avoid common failure scenarios where both host systems may have correlated or simultaneous failure.

As depicted in FIG. 1A, a database access request 102 may be received via an established connection 101 at database system 110. One or more virtualization snapshots 120 may be maintained in database systems 120, such as snapshots 122a through 122c, as well as an origin snapshot 124. As discussed in detail below with regard to FIGS. 5 and 9, a virtualization snapshot may be the state information stored in user space of the virtualized memory (e.g., as opposed to kernel space or otherwise allocated virtualized memory) that may be used to execute the query processor. Query processor snapshots 122a, 122b, 122c, and origin snapshot 124 may be created in various circumstances, as discussed in detail below and may be reusable to quickly restore a query processor to execution.

Figure 1B:
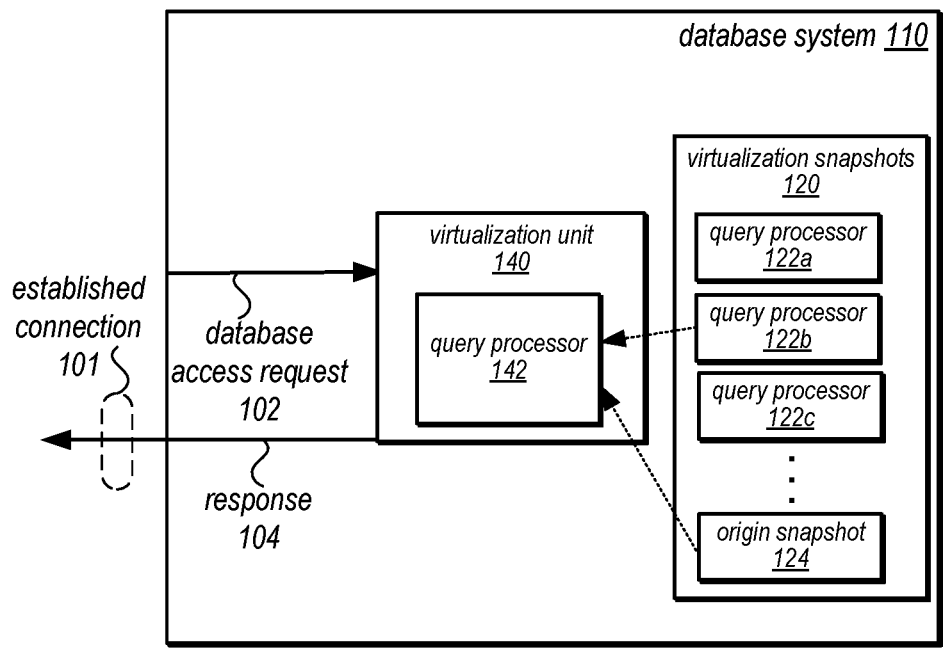

As depicted in FIG. 1B, one of the query processor snapshots, 122b, may be identified as having the established connection 101 and restored to execute in virtualization unit 140 as query processor 142 using origin snapshot 124 and query processor snapshot 122b. As discussed above, a virtualization unit may include a virtual machine instance, a micro virtual machine (MicroVM), container, or other virtualization technique. Origin snapshot 124 may store common or persisted data structures, shared user data, such as shared tables, or other state that can be used across query processors. Thus, by implementing techniques that reduce the size of query processor snapshots as a result of being able to use shared information stored in the origin snapshots, many query processor snapshots 122 (and thus many query processors) can be fit onto a single host system, allowing for more compact and thus more flexible query processor hosting placement decisions which can improve the ability of the database system to make optimal placement decisions in more scenarios (e.g., using a single query processor per connection or more capacity to co-locate query processors on a same host system). Request 102 can then be provided to query processor 142 which may perform the request and provide response 104 via connection 101.

Please note, FIGS. 1A-1B are provided as a logical illustration of a distributed database system and its respective components, as well as respective interactions and is not intended to be limiting as to the physical arrangement, size, or number of components, modules, or devices to implement such features. Additional multiple components may be involved, distributing the responsibilities for performing queries across multiple components (e.g., a query processor, adjudicator, and so on as illustrated below with regard to FIGS. 3-5).

The specification continues with an example network-based database service implemented as part of a provider network that performs compact hosting of query processors using virtualization snapshots. Included in the description of the example database service are various aspects of the example database service, such as a hosts for query processors, and a separate storage service. The specification then describes flowcharts of various embodiments of methods for synchronous database replication using erasure coding. Next, the specification describes an example system that may implement the disclosed techniques. Various examples are provided throughout the specification.

Figure 2:
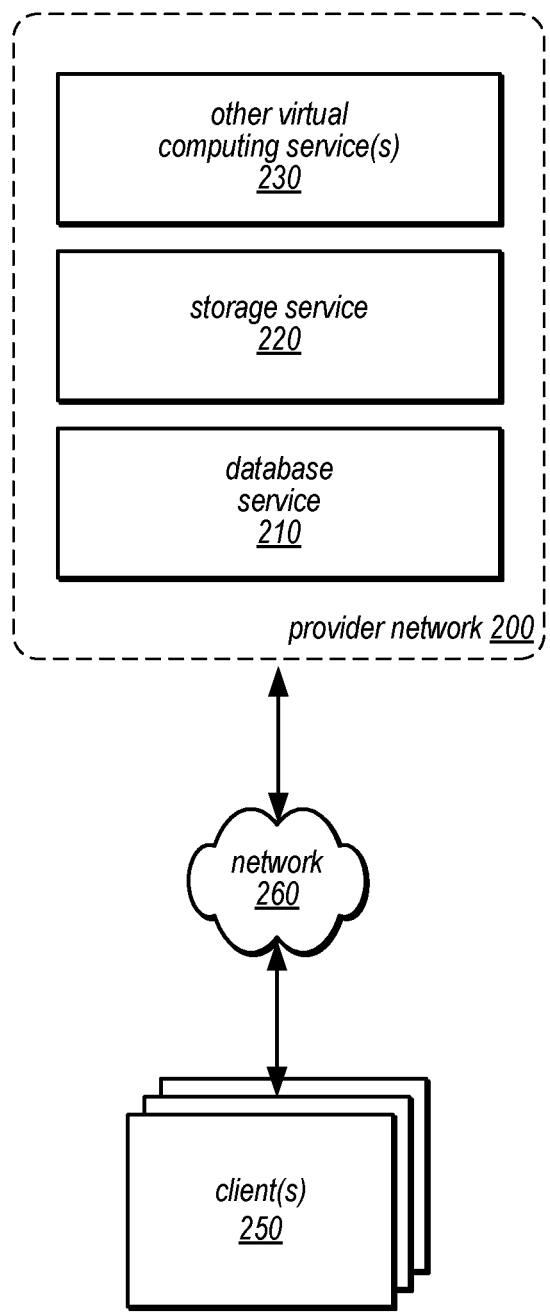
FIG. 2 is a block diagram illustrating provider network regions that may implement database services that implement techniques for compact hosting of query processors using MicroVM snapshots, according to some embodiments.

FIG. 2 is a block diagram illustrating provider network regions that may implement database services that implement techniques for compact hosting of query processors using virtualization snapshots, according to some embodiments. A provider network (sometimes referred to as a "cloud provider network" or "cloud") refers to a pool of network-accessible computing resources (such as compute, storage, and networking resources, applications, and services), which may be virtualized or bare-metal. The provider network can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users can connect to availability zones of the provider network via a publicly accessible network (e.g., the Internet, a cellular communication network) by way of a transit center (TC). TCs can be considered as the primary backbone locations linking users to the provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The provider network may deliver content from points of presence outside of, but networked with, these regions by way of edge locations and regional edge cache servers (points of presence, or PoPs). This compartmentalization and geographic distribution of computing hardware enables the provider network to provide low-latency resource access to users on a global scale with a high degree of fault tolerance and stability.

The provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the provider network, which may be provisioned in user accounts.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

As depicted in FIG. 2, an exemplary provider network may include numerous provider network regions and so on that may include one or more data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network within the provider network regions.

In the illustrated embodiment, a number of clients (shown as clients 250 may interact with a provider network 200 via a network 260. Provider network may implement respective instantiations of the same (or different) services, a database service 210 for a first region and a second instantiation of database service 210 for a second region 200, and so son on. Similar arrangements may be implemented for storage service 220, as well as various other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to provider network 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with service of a region of a provider network. In some embodiments, client 250 may generate network-based services requests according to a Representational State Transfer (REST)-style web services architecture, a document- or message-based network-based services architecture, or another suitable network-based services architecture. Although not illustrated, some clients of provider network 200 services may be implemented within a service of the provider network (e.g., a client application of database service 210 may be implemented on one of other virtual computing service(s) 230), in some embodiments. Therefore, various examples of the interactions discussed with regard to clients 250 may be implemented for internal clients as well, in some embodiments.

In some embodiments, a client 250 (e.g., a database service client) may be may provide access to network-based storage of database data to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to the provider network may be coordinated by client 250 and the operating system or file system on behalf of applications executing within the operating system environment.

Clients 250 may convey network-based services requests to and receive responses from a region of the provider network via network 260. In various embodiments, network 260 may encompass any suitable combination of networking hardware and protocols necessary to establish network-based communications between clients 250 and a provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and the provider network region may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and a provider network. It is noted that in some embodiments, clients 250 may communicate with regions of a provider network using a private network rather than the public Internet. For example, clients 250 may be provisioned within the same enterprise as a database service. In such a case, clients 250 may communicate with a provider network region entirely through a private network 260 (e.g., a LAN or WAN that may use Internet-based communication protocols but which is not publicly accessible).

Generally speaking, provider network 200 may implement one or more service endpoints may receive and process network-based services requests, such as requests to access a database (e.g., queries, inserts, updates, etc.) and/or manage a database (e.g., create a database, configure a database, etc.). For example, a provider network region may include hardware and/or software may implement a particular endpoint, such that an HTTP-based network-based services request directed to that endpoint is properly received and processed. In one embodiment, a provider network region may be implemented as a server system may receive network-based services requests from clients 250 and to forward them to components of a system that implements database service 210, storage service 220 and/or another virtual computing service 230 for processing. In other embodiments, provider network region may be configured as a number of distinct systems (e.g., in a cluster topology) implementing load balancing and other request management features may dynamically manage large-scale network-based services request processing loads. In various embodiments, a provider network region may be may support REST-style or document-based (e.g., SOAP-based) types of network-based services requests.

In addition to functioning as an addressable endpoint for clients' network-based services requests, in some embodiments, a provider network 200 may implement various client management features. For example, provider network 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network regions may also implement financial accounting and billing systems, or may maintain a database of usage data that may be queried and processed by external systems for reporting and billing of client usage activity. In certain embodiments, provider network regions may collect, monitor and/or aggregate a variety of storage service system operational metrics, such as metrics reflecting the rates and types of requests received from clients 250, bandwidth utilized by such requests, system processing latency for such requests, system component utilization, such as the target capacity determined for individual database engine head node instances, network bandwidth and/or storage utilization, rates and types of errors resulting from requests, characteristics of stored and databases (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, provider network regions may also implement user authentication and access control procedures. For example, for a given network-based services request to access a particular database table, a provider network region ascertain whether the client 250 associated with the request is authorized to access the particular database table. Provider network regions may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, the provider network region may reject the corresponding network-based services request, for example by returning a response to the requesting client 250 indicating an error condition. Various access control policies may be stored as records or lists of access control information by database services 210, storage services 220 and/or other virtual computing services 230.

Note that in many of the examples described herein, services, like database service or storage service may be internal to a computing system or an enterprise system that provides database services to clients 250, and may not be exposed to external clients (e.g., users or client applications). In such embodiments, the internal "client" (e.g., database service 210) may access storage service 220 over a local or private network (e.g., through an API directly between the systems that implement these services). In such embodiments, the use of storage service 220 in storing database tables on behalf of clients 250 may be transparent to those clients. In other embodiments, storage service 220 may be exposed to clients 250 through provider network 200 to provide storage of database tables or other information for applications other than those that rely on database service 210 for database management. In such embodiments, clients of the storage service 220 may access storage service 220 via network 260 (e.g., over the Internet). In some embodiments, a virtual computing service 230 may receive or use data from storage service 220 (e.g., through an API directly between the virtual computing service 230 and storage service 220) to store objects used in performing computing services 230 on behalf of a client 250. In some cases, the accounting and/or credentialing services of provider network region may be unnecessary for internal clients such as administrative clients or between service components within the same enterprise.

Figure 3:
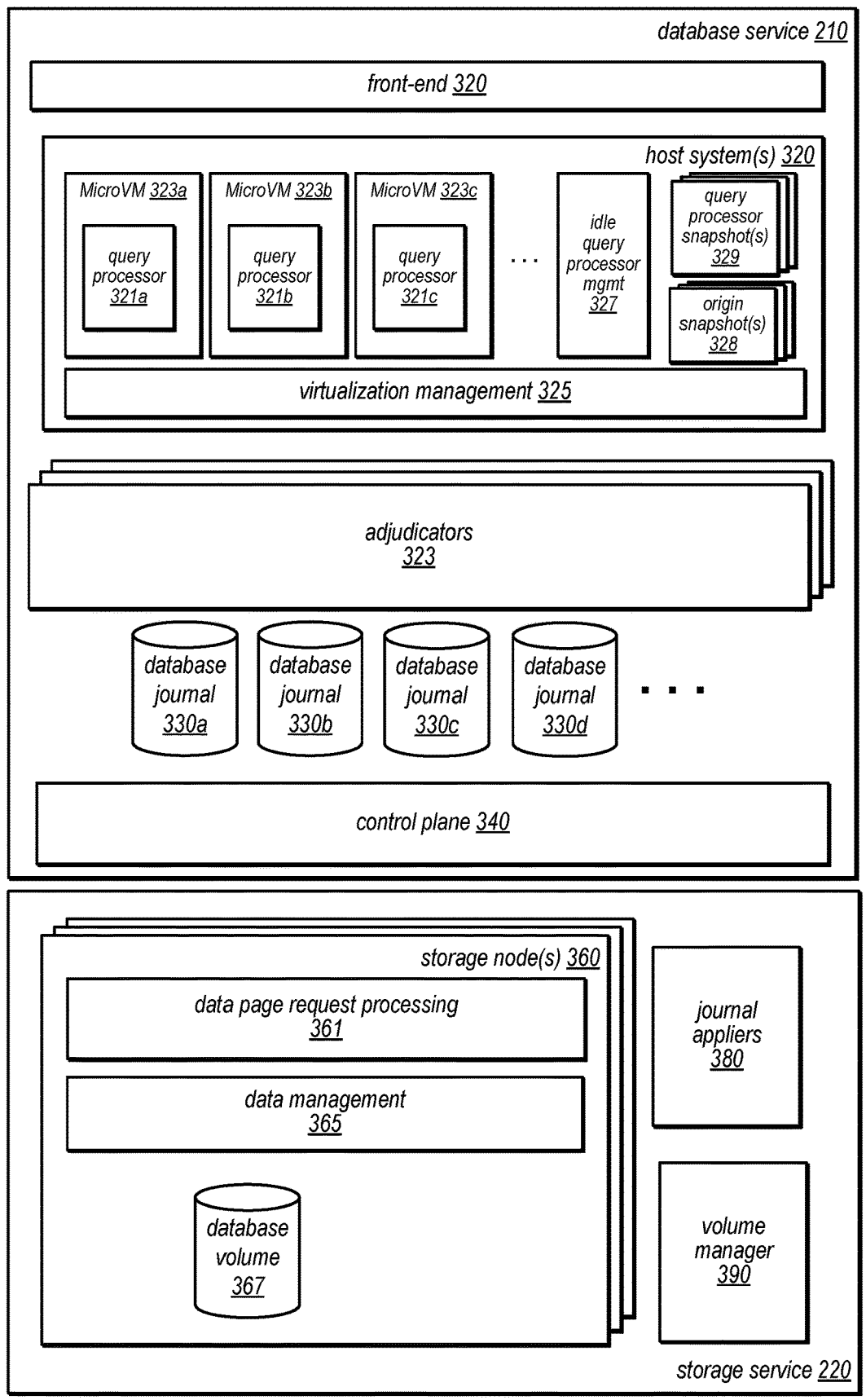
FIG. 3 is a block diagram illustrating various components of a database service and storage service that host databases accessible to database clients, according to some embodiments.

FIG. 3 is a block diagram illustrating various components of a database service and storage service that host databases accessible to database clients, according to some embodiments. Database service 210 may implement control plane 340 which may manage the creation, provisioning, deletion, or other features of managing a database hosted in database service 210. For example, control plane 340 may monitor the performance of host(s) (e.g., a computing system or device like computing system 1000 discussed below with regard to FIG. 9) for high workloads (e.g., heat) and move or redirect placement of database engine head node instances away from some hosts to avoid overburdening host(s) 310. Control plane 340 may handle various management requests, such as request to create databases, manage databases (e.g., by configuring or modifying performance, such as by enabling a "serverless" or other automated management feature in response to a request which may cause in-place resource scaling to be enabled for that database. Control plane 340 may direct placement of database engine head node instances on host(s) so as to distribute workload across host(s) to avoid failure scenarios, like out-of-memory.

Database service 210 may implement one or more different types of database systems with respective types of query processors for accessing database data as part of the database. For example, database service 210 may implement various types of connection-based (e.g., having established a network connection between a database client and query processor 321 on a database host system 320) database systems which may, for instance, facilitate the performance of various operations that continue over multiple communications between the database client and the connected query processor 321. In at least some embodiments, database service 210 may be a relational database service that hosts relational databases on behalf of clients.

Database service 210 may implement a fleet of host system(s) 320 which may provide, in various embodiments, a multi-tenant configuration so that different query processors, such as database instance 321a, 321b, and 321c, can be hosted on the same host system 310, but provide access to different databases on behalf of different clients over different connections. In some embodiment hosts systems(s) 320 may not be multi-tenant.

In various embodiments, host system(s) 320 may implement a virtualization technology, that provides virtualized execution of a query processor 321 in a virtualization unit, such as virtual machine based virtualization or container-based virtualization, wherein query processors 321 may be executed in different respective virtual machines, micro virtual machines (microVMs) as illustrated in FIG. 3 which may offer a reduced or light-weight virtual machine implementation that retains use of individual kernels within a microVM, or containers which offer virtualization of an operating system using a shared kernel. Host system(s) 320 may implement virtualization management 325, which may support hosting one or multiple separate query processors 321 as different respective virtualization units, like VMs, the illustrated microVMs, or containers. Virtualization management 325 may support increasing or decreasing resources made available to host(s) to use for other tasks.

Figure 5:
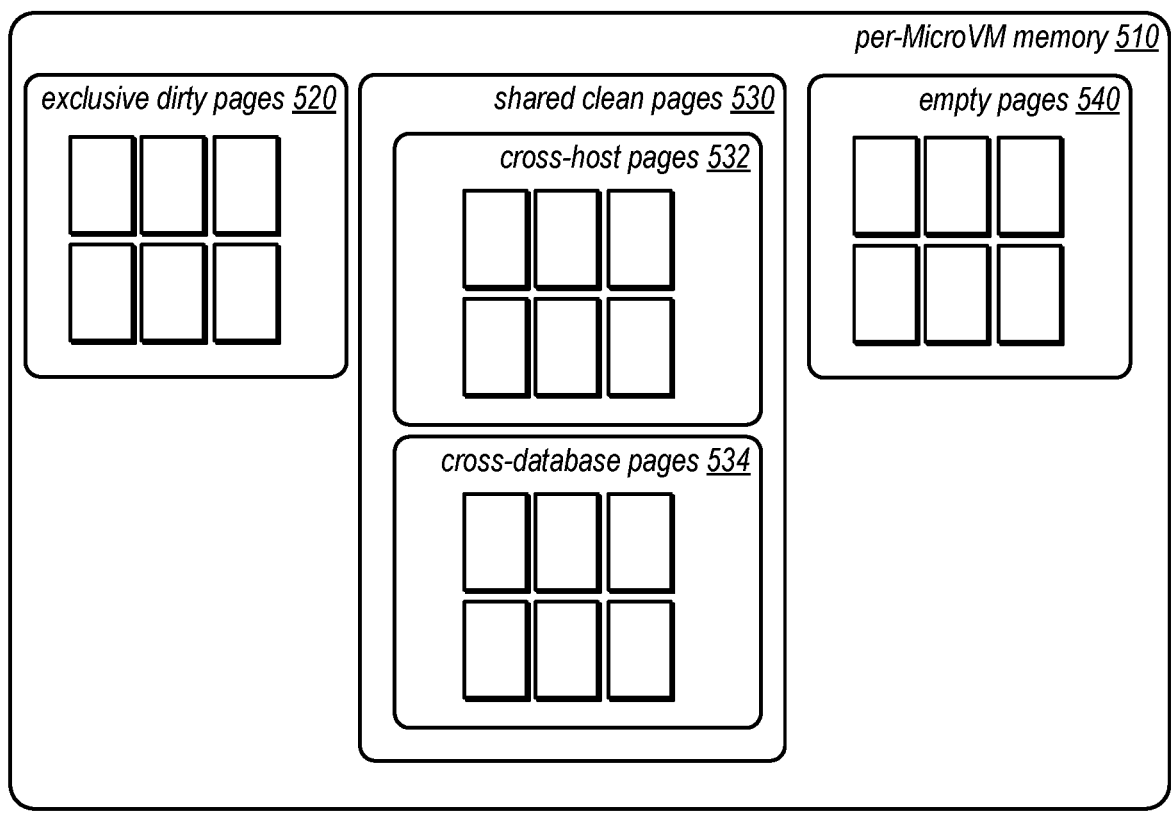
FIG. 5 is a block diagram illustrating a MicroVM memory for compact hosting of query processors using MicroVM snapshots, according to some embodiments.
Figure 6A:
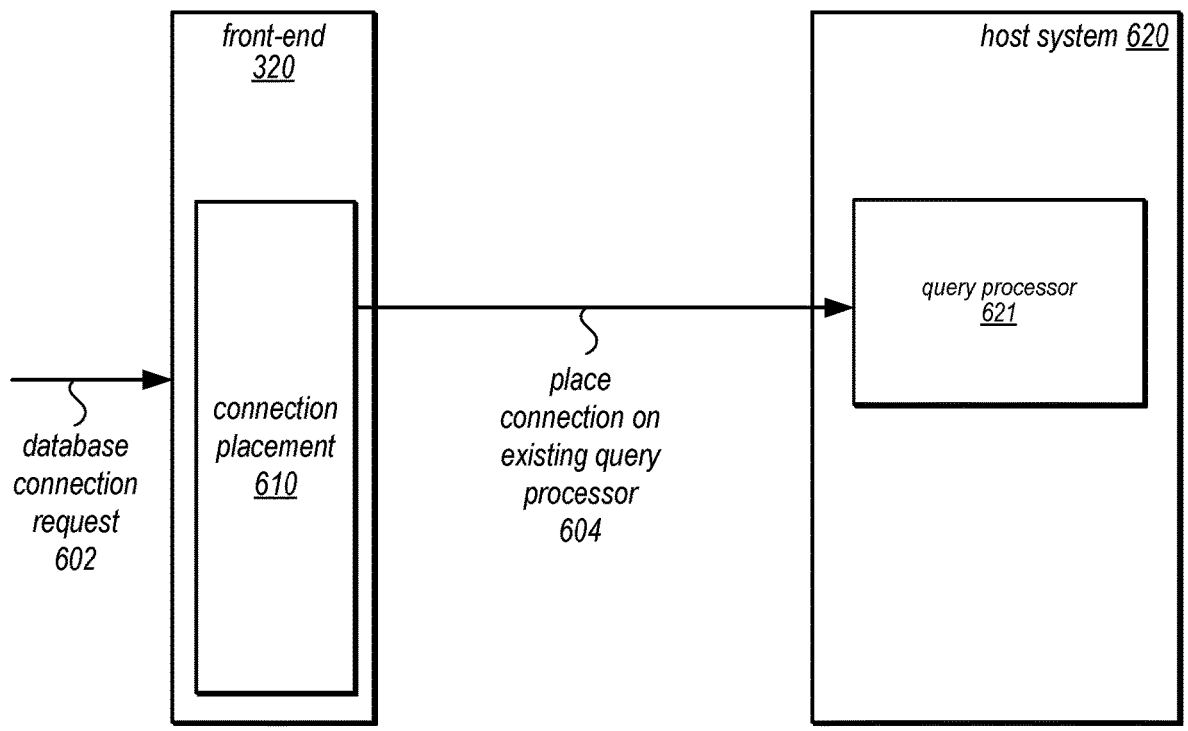
FIGS. 6A-6B are logical block diagram illustrating placement decisions for database connections based on compact hosting of query processors using MicroVM snapshots, according to some embodiments.

As discussed above with regard to FIG. 1 and below with regard to FIGS. 5 through 8, host systems 320 may support various features for accessing a database, such as query processor(s) 321 on MicroVMs 323 and use idle query processor management 327 to implement the techniques discussed above and below with regard to FIGS. 7 and 8 based on query processor snapshots 329, and adjudicator(s) 323 discussed in detail below with regard to FIGS. 4-5. For example, idle query processor management 327 may execute workflows to generate query processor snapshots, obtain, create, or replace origin snapshots, stop execution of idle query processors, restart execution of query processors using a restore workflow, and other query processor management operations. Query processor snapshot(s) 329 and origin snapshot(s) 328 may be stored in host system 320 on one or more non-volatile memory devices, such as flash-based random access memory or other non-volatile memory. Query processors 321 may implement other agents, interfaces, or other controls (not illustrated) according to the respective type of virtualization used to collect and facilitate communication of utilization metrics for in-place scaling, among other supported aspects of virtualization. This information may be shared with idle query processor management 327 (or be implemented as part of idle query processor management 327). In some embodiments, snapshot information, such as the number or size of pages in an origin snapshot (or query processor snapshot) may be shared with control plane 340 for placement decisions, as discussed below with regard to FIGS. 6A and 6B.

In some embodiments, database data for a database of database service 210 may be stored in a separate storage service 220. In some embodiments, storage service 220 may be implemented as to store database data as virtual disk or other persistent storage drives. In other embodiments, embodiments, storage service 220 may store data for databases using log-structured storage.

For example, data may be organized in various logical volumes, segments, and pages for storage on one or more storage nodes 360 of storage service 220. For example, in some embodiments, each database may be represented by a logical volume, and each logical volume may be segmented over a collection of storage nodes 360. Each segment, which may live on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

In some embodiments, storage nodes 360 of storage service 220 may perform some database system responsibilities, such as the updating of data pages for a database, and in some instances perform some query processing on data. As illustrated in FIG. 3, storage node(s) 360 may implement data page request processing 361, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), clone volume creation, log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages to be returned responsive to a request.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

In some embodiments, respective database journals, such as database journals 330a through 330d, may be hosted in database service that store ordered updates to the database (e.g., to a database volume). Adjudicators 323 may responsible for deciding whether transactions or writes can be committed (while following isolation rules), for working with database journal(s) 330a through 330d to order transactions, and for ensuring that committed data is strongly consistent.

Front-end 320 may implement a proxy, request router or other load balancing feature that routes database requests to one or more query processors 321. For example, front-end 320 may be responsible for authenticating requests to connect to a database at a particular network endpoint and allocating a query processor 321 to the connection (or to a particular request such as a query or transaction). The front-end 320 may maintain the connection (e.g., as a proxy) so that if different query processors are used for different requests to the database, separate connections do not have to be established.

Figure 4:
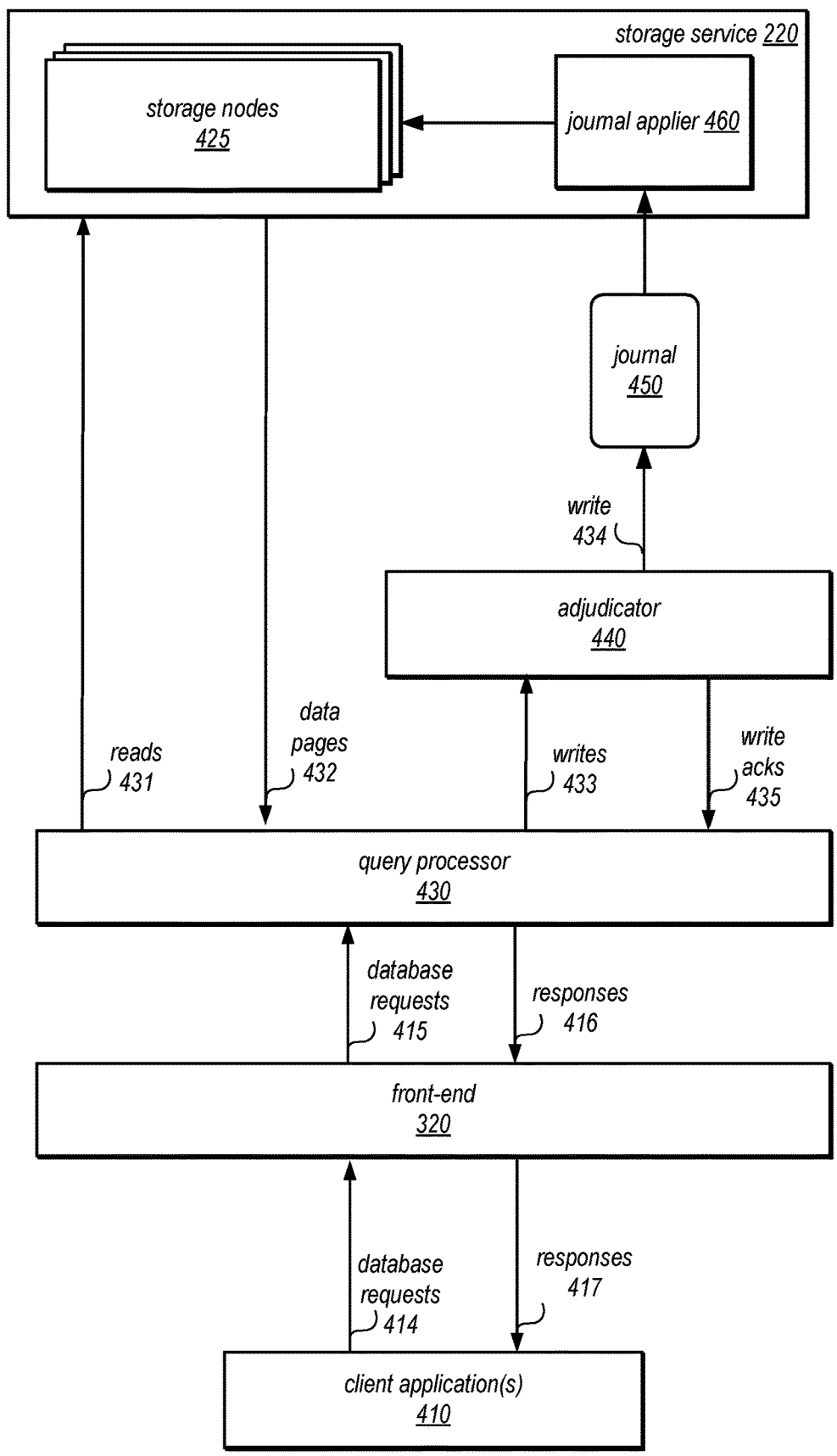
FIG. 4 is a block diagram illustrating the interactions between a database service and separate storage service, according to some embodiments.

FIG. 4 is a block diagram illustrating various interactions to handle database client requests, according to some embodiments. In this example, one or more client application(s) 410 may store data to one or more databases maintained by a database service 210. Client application(s) 410 may submit database requests 414 (e.g., requests that cause reads, such as queries or read-only transactions, or requests that cause writes, such as updates, inserts, deletions, or transactions that include write statements) and receive responses 417 from front-end 320.

Front-end 320 may dispatch database requests 415 to a query processor 430, which may parse the request and interact with different components according to the type of request. For read request, query processor 430 may rely upon a local cache and/or access storage nodes 425 by submitting read requests 431 for data pages, which are returned 432 and used to perform the read. For writes, write requests may be sent to an adjudicator 440, which determine whether a conflict exists and if not, writes 434 to journal 450 and acknowledges the write 435 to query processor 430. Responses 416 may then be sent to front-end 320 for response 417 to client application(s) 410.

As discussed above with regard to FIG. 1, a database may be replicated. In some scenarios this replication may be across regions. FIG. 5 is a block diagram illustrating a MicroVM memory for compact hosting of query processors using MicroVM snapshots, according to some embodiments. Effective memory deduplication may support compact implementation of query processors on a single host system. In the example memory illustrated in FIG. 5, part of each MicroVM's memory is backed by a set of exclusive dirty pages, such as exclusive dirty pages 520, which have been written to by that MicroVM. Some of these pages are in memory (because they have been read or written since this MicroVM was last snapshotted) and thus are memory-backed dirty pages, or on disk or other persistent block storage device (because they have not been written to and thus are not in memory 510 and thus are block-based persistent storage-backed). Another part of the memory is backed by clean pages, such as shared clean pages 530, which have been read but not written by this MicroVM. These clean pages are shared with all other MicroVMs on the same host system that were restored from the same origin snapshot. In some embodiments, cross-database pages 534 may be shared across an entire database (e.g., across more than one host system). In some embodiments, the last part of the MicroVM's memory 510 may not really memory at all, but unmapped empty pages.

In at least some embodiments, query processors and other virtualization components may work to ensure that unused pages of memory are returned. For example, both the query processor and a guest kernel may return pages that they no longer needed. Dirty pages, for instance, may be returned as the contents of the dirty pages may not be needed. Instead, the query processor can turn them into empty pages that can be re-used by other MicroVMs. In such an embodiment, the query process may return unused memory to the guest kernel (e.g. via free or munmap operations), and the OS and virtualization management may ensure that the freed pages are made available for re-use.

Because of compact implementations of query processors using virtualization snapshots and origin snapshots, placement decisions for connections to a database may be further optimized (in addition to the quick resume techniques discussed above with regard to FIG. 1). FIGS. 6A-6B are logical block diagrams illustrating placement decisions for database connections based on compact hosting of query processors using MicroVM snapshots, according to some embodiments. In FIG. 6A, a database connection request 602 may be received at front-end 320. Front-end 320 may implement connection placement 610. Connection placement 610 may implement various techniques for making placement decisions. For example, connection placement 610 may maintain placement data or mapping information that indicates a current allocation of query processors and host systems to database connections. According to this information, connection placement 610 may apply various placement techniques (e.g., round-robin among host systems, location-based selection of host systems, and so on) on available capacity to serve a connection (e.g., at an existing query processor or new query processor on a host system (or across multiple host systems)). In at least some embodiments, the snapshot information for query processors, such as an origin snapshot size, may be used as part of the placement technique. For example, in FIG. 6A, a placement decision is made to place 604 the connection on an existing query processor 621 at host system 620, based on the number of shared pages in an origin snapshot. This may be optimal because, for example, the number of shared pages may be few and therefore the amount of non-shared memory for each query processor may be larger, lessening the ability to expand the number of query processors on a host system 620.

Figure 6B:
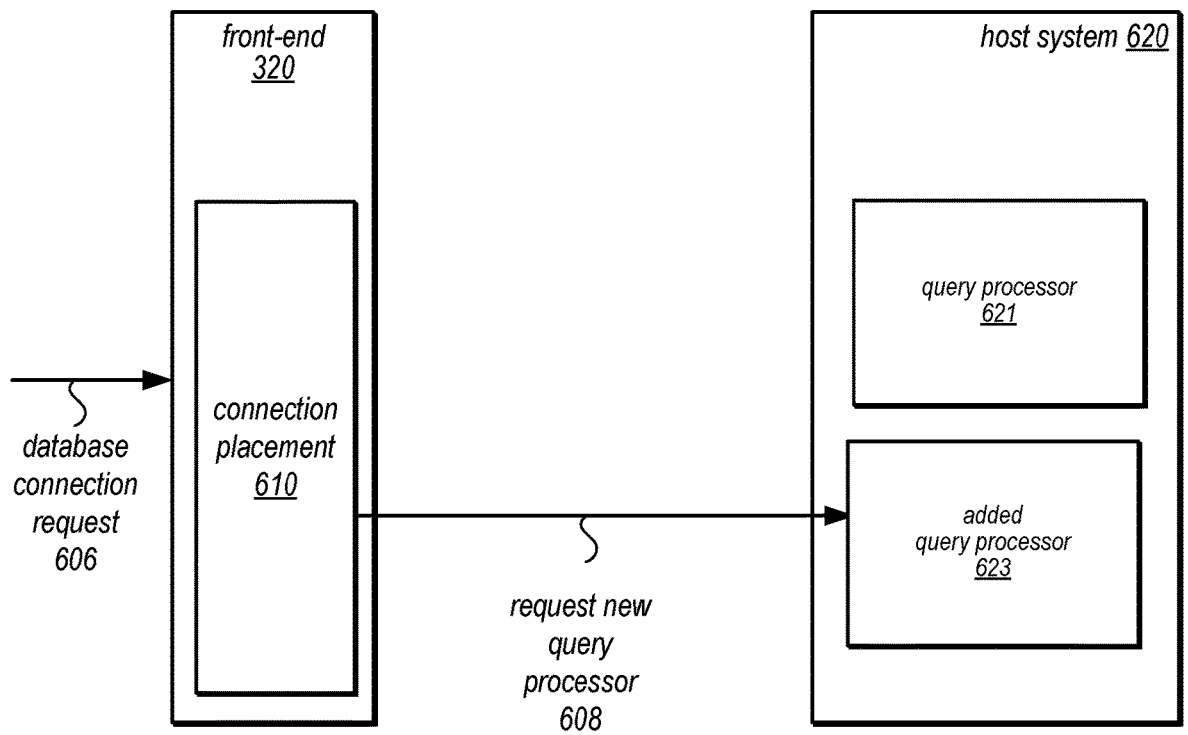

In FIG. 6B, a different scenario is illustrated. In this example, a database connection request 606 may be placed, as indicated at 608 on a new query processor 623 based on the number of shared pages in an origin snapshot. For example, a threshold number, criteria, or other number may be used to distinguish between large and small amounts of shared pages may be used. For large amounts of shared pages, more capacity may exist to add new query processor may exist (as the non-shared memory of query processors may be smaller). Both placement request 604 and 608 may be made to an idle query processor management (not illustrated but similar to idle query processor management 327 discussed above with regard to FIG. 3), in some embodiments, which may execute the placement workflows on host system 620.

The database service and storage service discussed in FIGS. 2 through 6B, provide examples of a system that may implement the above techniques. However, various other types of distributed database systems (as discussed above with regard to FIG. 1) may implement these techniques. Various different systems and devices of a distributed database system may implement the various methods and techniques described below, either singly or working together. For example, a control plane component of a distributed database system and/or a database instance may implement the various methods. Alternatively, a combination of different systems and devices may implement these techniques. Therefore, the above examples and or any other systems or devices referenced as performing the illustrated method, are not intended to be limiting as to other different components, modules, systems, or configurations of systems and devices.

Figure 7:
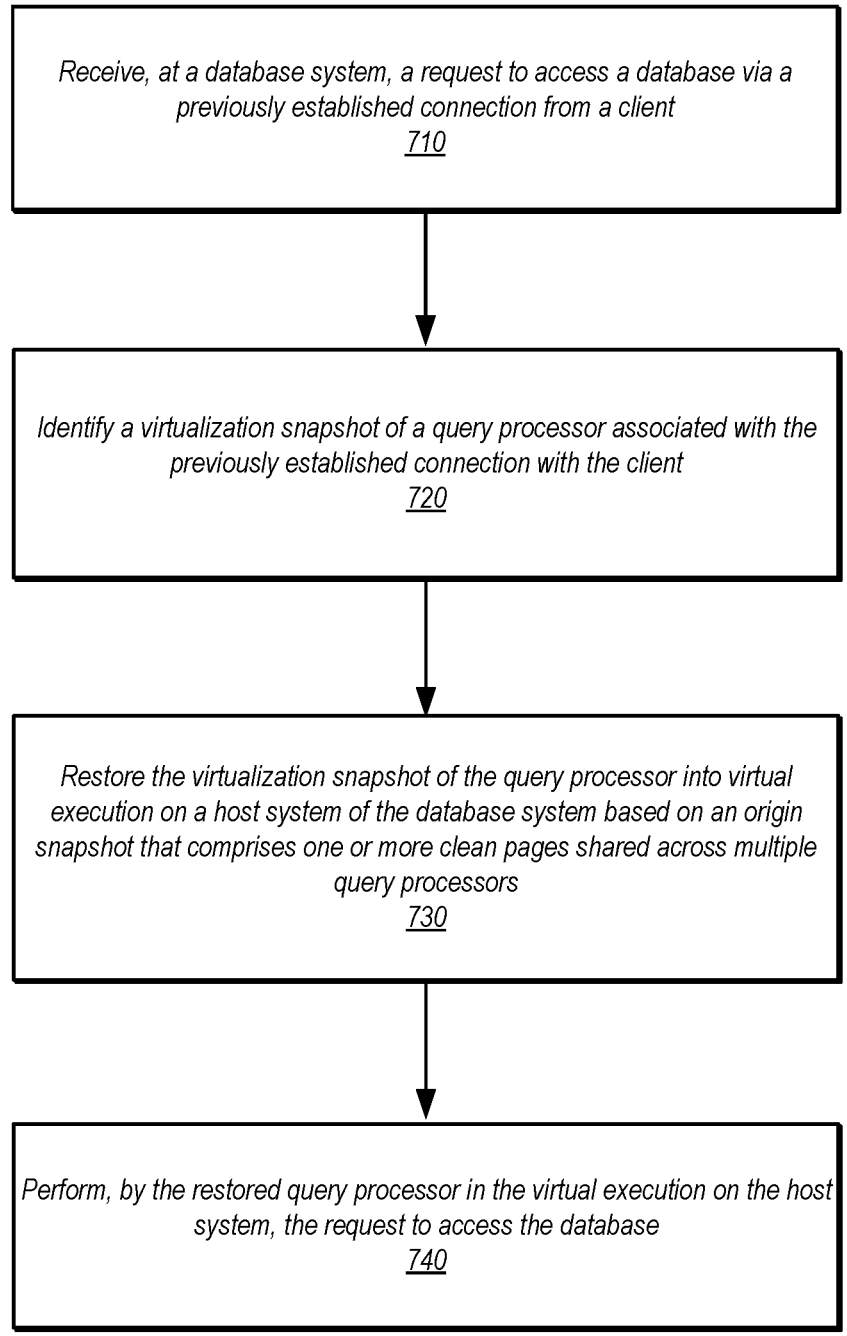
FIG. 7 is a high-level flowchart illustrating various methods and techniques to implement compact hosting of query processors using virtualization snapshots, according to some embodiments.

FIG. 7 is a high-level flowchart illustrating various methods and techniques to implement compact hosting of query processors using virtualization snapshots, according to some embodiments. As indicated at 710, a request to access a database via a previously established connection from a client may be received at a database system, in some embodiments. For example, the request may be received at a front-end component of a database service (e.g., front-end 320 of database service 210) or directly at a host system (e.g., at an idle query processor management component). The request to access the database may include operations to read, write, delete, or otherwise utilize the database.

A determination may be made that no currently executing query processor is associated with the previously established connection. For example, mapping information or other metadata may be maintained at the host system (e.g., by idle query processor management) that identifies whether a given connection is active and executing, or in-active and thus not currently executing. If a query processor for the previously established connection is active and executing, then the active and executing query processor is used to perform the request. However, if not active and executing, then, as indicated at 720, a snapshot of a query processor associated with the previously established connection with the client may be identified, in some embodiments. For example, the mapping information may include metadata or other descriptions of the available virtualization snapshots for different idle query processors. An identifier of the connection, for instance, may be used to lookup or identify the virtualization snapshot of the query processor that had previously been connected to the client.

As indicated at 730, the virtualization snapshot of the query processor may be restored into a virtual execution on a host system of the database system based on an origin snapshot that comprises one or more clean pages shared across multiple query processors, in some embodiments For example, a restore technique may load application instructions for the query processor into a portion of host system memory re-allocated to the query processor and place into another portion of the host system memory re-allocated to the query processor, the exclusive dirty data pages, as illustrated and discussed above with regard to FIG. 5. Because shared data pages may not be data pages that are written to by the query processor, these may be identified and made accessible in shared memory of the host system supported by virtualization management at the host system. If a shared page needs to be written, an exclusive dirty page copy may be created and stored in the portion re-allocated to the query processor. The restore process may resume execution of the query processor using the application instructions, restored dirty pages and shared pages.

As indicated at 740, the restored query processor in the virtual execution on the host system, may perform the request to access the database, in some embodiments. A response or other appropriate indication may be returned to the client, in some scenarios, according to the type of access request.

Figure 8:
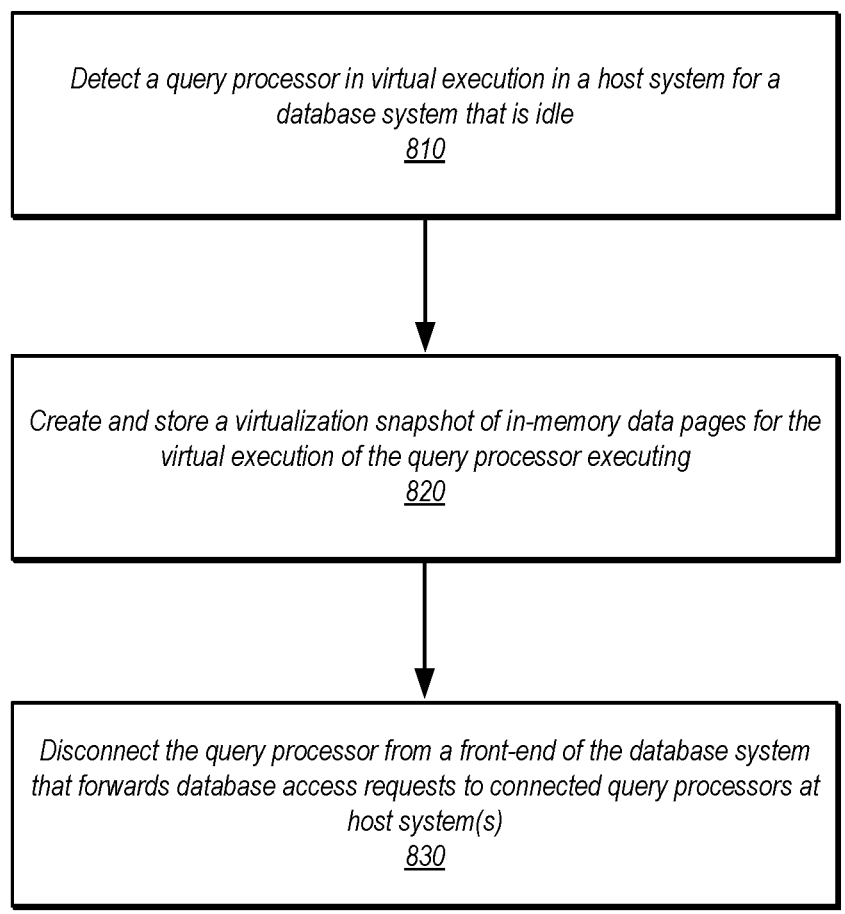
FIG. 8 is a high-level flowchart illustrating various methods and techniques to implement creating a virtualization snapshot for query processors, according to some embodiments.

FIG. 8 is a high-level flowchart illustrating various methods and techniques to implement creating a MicroVM snapshot for query processors, according to some embodiments. As indicated at 810, a query processor in virtual execution in a host system for a database system may be detected that is idle, in some embodiments. For example, a timer or other counter since work is performed by the query processor or since a last access request is received may be monitored. If the timer exceeds an idle query processor time limit, then the query processor may be detected as idle. In some embodiments, a client may signal that a connection may become idle for a period of time or provide other indications that more requests are not forthcoming. In those scenarios, the query processor may also be detected as idle.

As indicated at 820, responsive to detecting the idle query processor, a virtualization snapshot of in-memory data pages for the virtual execution of the query processor may be created and stored, in some embodiments. In various embodiments, the virtualization snapshot may include data pages in user space for the virtual execution of the query processor. The stored data pages may include copies of the exclusive dirty pages and identifiers of the shared clean pages (which can be re-obtained from the origin snapshot). The virtualization snapshot may be stored in a non-volatile memory device (e.g., flash RAM or other non-volatile memory technology that may be provide fast access times).

As indicated at 830, the query processor may be disconnected from a front-end of the database system that forwards database access requests to connected query processors at host system(s), in some embodiments. For example, a disconnection request or idle query processor indicator may be sent to the front-end.

The methods described herein may in various embodiments be implemented by any combination of hardware and software. For example, in one embodiment, the methods may be implemented on or across one or more computer systems (e.g., a computer system as in FIG. 9) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
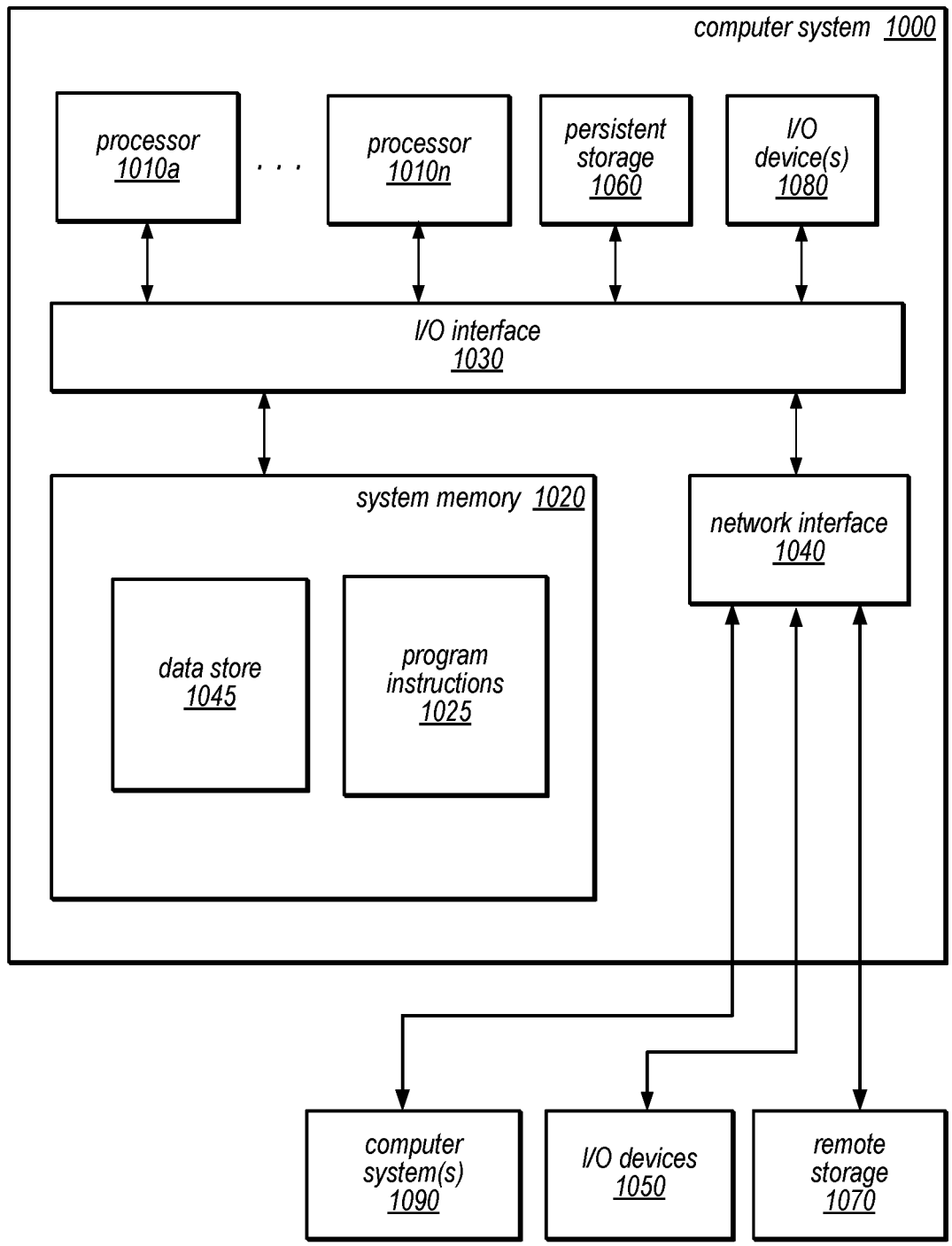
FIG. 9 is a block diagram illustrating an example computer system, according to various embodiments.

FIG. 9 is a block diagram illustrating an example computer system, according to various embodiments. For example, computer system 1000 may implement synchronous database replication using erasure coding, in various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, primary nodes, read-only node nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising: at least one processor; and a non-volatile memory storing one or more micro virtual machine (MicroVM) snapshots of respective query processors;
   a volatile memory, storing program instructions that when executed by the at least one processor cause the at least one processor to implement idle query processor management for a host system for query processors of a database system, wherein the idle query processor management is configured to:
   receive a request to access a database via a previously established connection from a client;
   identify one of the MicroVM snapshots of the respective query processors with the previously established connection with the client after that one respective query processor was previously determined to be idle;
   cause restoration of the MicroVM snapshot of the query processor into a MicroVM on a host system of the database system based on an origin snapshot that comprises one or more clean pages shared across multiple query processors; and
   cause the restored query processor in the MicroVM on the host system to perform the request to access the database.

2. The system of claim 1, wherein the idle query processor management is further configured to:
   detect that the query processor is idle;
   responsive to the detection that the query processor is idle, create and store the one MicroVM snapshot of the query processor in the non-volatile memory; and
   disconnect the query processor from a front-end of the database system that forwards database access requests to connected query processors of the database system.

3. The system of claim 1, wherein the query processor is configured to cause one or more other data pages in-memory for the query processor to be made free at the host system.

4. The system of claim 1, wherein the database system is a relational database service implemented as part of a provider network.

5. A method, comprising:
   receiving, at a database system, a request to access a database via a previously established connection from a client;
   identifying, by the database system, a virtualization snapshot of a query processor with the previously established connection with the client;
   restoring, by the database system, the virtualization snapshot of the query processor from a non-volatile memory into virtual execution on a host system of the database system based on an origin snapshot that comprises one or more clean pages shared across multiple query processors; and
   performing, by the restored query processor in the virtual execution on the host system, the request to access the database.

6. The method of claim 5, further comprising:
   detecting, by the database system, that the query processor is idle;
   responsive to detecting that the query processor is idle, creating and storing the virtualization snapshot of the query processor; and disconnecting the query processor from a front-end of the database system that forwards database access requests to connected query processors of the database system.

7. The method of claim 5, wherein at least one of the one or more clean pages is shared across a plurality of host systems that provide access to the database.

8. The method of claim 5, further comprising causing by the query processor one or more other data pages in-memory for the query processor to be made free at the host system.

9. The method of claim 5, further comprising:
receiving, at the database system, a request to establish a connection to the database for a different database client; and
determining, by the database system, to establish the connection with a new query processor to be executed in a new virtual execution added to the host system based, at least in part, on the origin snapshot that comprises the one or more clean pages shared across the multiple query processors.

10. The method of claim 5, further comprising:
receiving, at the database system, a request to establish a connection to the database for a different database client; and
determining, by the database system, to establish the connection with the query processor based, at least in part, on the origin snapshot that comprises the one or more clean pages shared across the multiple query processors.

11. The method of claim 5, further comprising:
receiving, at the database system, a second request to access the database via a different previously established connection from a different client;
identifying, by the database system, a different virtual execution of a different query processor with the different previously established connection with the client; and
performing, by the different query processor in the different virtual execution on the host system, the request to access the database.

12. The method of claim 5, further comprising after exceeding a time-to-live for the query processor, stopping the virtual execution of the query processor.

13. The method of claim 5, further comprising after exceeding a time-to-live for database connections, disconnecting the query processor in the virtual execution from the client.

14. One or more non-transitory, computer-readable storage media, storing program instructions that when executed on or across one or more computing devices cause the one or more computing devices to implement a database system that implements:
receiving a request to access a database via a previously established connection from a client;
identifying a virtualization snapshot of a query processor in a non-volatile memory with the previously established connection with the client created after determining that the query processor was idle;
causing restoration of the virtualization snapshot of the query processor into a virtual execution on a host system of the database system based on an origin snapshot that comprises one or more clean pages shared across multiple query processors; and
causing the restored query processor in the virtual execution on the host system to perform the request to access the database.

15. The one or more non-transitory, computer-readable storage media of claim 14, storing further program instructions that when executed on or across the one or more computing devices, cause the one or more computing devices to further implement:
detecting, by the database system, that the query processor is idle;
responsive to detecting that the query processor is idle, creating and storing the virtualization snapshot of the query processor; and
disconnecting the query processor from a front-end of the database system that forwards database access requests to connected query processors of the database system.

16. The one or more non-transitory, computer-readable storage media of claim 14, storing further program instructions that when executed on or across the one or more computing devices, cause the one or more computing devices to further implement causing by the query processor one or more other data pages in-memory for the query processor to be made free at the host system.

17. The one or more non-transitory, computer-readable storage media of claim 14, storing further program instructions that when executed on or across the one or more computing devices, cause the one or more computing devices to further implement:
receiving, at the database system, a request to establish a connection to the database for a different database client; and
determining, by the database system, to establish the connection with a new query processor to be executed in a new virtual execution added to the host system based, at least in part, on the origin snapshot that comprises the one or more clean pages shared across the multiple query processors.

18. The one or more non-transitory, computer-readable storage media of claim 14, storing further program instructions that when executed on or across the one or more computing devices, cause the one or more computing devices to further implement:
receiving, at the database system, a second request to access the database via a different previously established connection from a different client;
identifying, by the database system, a different virtual execution of a different query processor with the different previously established connection with the client; and
performing, by the different query processor in the different virtual execution on the host system, the request to access the database.

19. The one or more non-transitory, computer-readable storage media of claim 14, storing further program instructions that when executed on or across the one or more computing devices, cause the one or more computing devices to further implement after exceeding a time-to-live for the query processor, stopping the virtual execution of the query processor.

20. The one or more non-transitory, computer-readable storage media of claim 14, wherein the virtualization snapshot and the origin snapshot are respective snapshots of user space for the query processor and another query processor in virtualized memory for the query processor and the other query processor.

* * * * *